(12) United States Patent
Joshi et al.

(10) Patent No.: US 12,493,735 B2
(45) Date of Patent: Dec. 9, 2025

(54) SEMICONDUCTOR VOID PLACEMENT

(71) Applicant: Intel Corporation, Santa Clara, CA (US)

(72) Inventors: Prakaram Joshi, Gilbert, AZ (US); Todd Snider, Mesa, AZ (US); Srinivas Moola, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 17/889,405

(22) Filed: Aug. 17, 2022

(65) Prior Publication Data
US 2024/0061987 A1  Feb. 22, 2024

(51) Int. Cl.
*G06F 30/398* (2020.01)
*G06F 113/18* (2020.01)

(52) U.S. Cl.
CPC ........ *G06F 30/398* (2020.01); *G06F 2113/18* (2020.01)

(58) Field of Classification Search
CPC .... G06F 30/39; G06F 2119/18; G06F 30/398; G06F 30/392; G06F 30/373; G06F 30/347; G06F 2113/18; G06F 30/327; G06F 30/38; G06F 30/394; G06F 30/396; G06F 30/27; H01L 23/528; H01L 21/033; H01L 23/5222; H01L 23/5223; H01L 23/53228; H01L 23/53238; H01L 23/53295; H01L 21/28123; H01L 23/525; H01L 23/5286; G03F 1/36; G03F 1/70
USPC .................................................. 716/108–115
See application file for complete search history.

(56) References Cited

U.S. PATENT DOCUMENTS

| | | | |
|---|---|---|---|
| 2005/0133848 A1* | 6/2005 | Rotella | H10D 84/212 |
| | | | 257/532 |
| 2014/0001597 A1* | 1/2014 | Huang | H10D 1/68 |
| | | | 257/532 |
| 2015/0333003 A1* | 11/2015 | Huang | H01L 21/31116 |
| | | | 257/532 |

* cited by examiner

*Primary Examiner* — Binh C Tat
(74) *Attorney, Agent, or Firm* — Viering, Jentschura & Partner mbB

(57) ABSTRACT

A method of semiconductor modelling includes determining for a virtual model of a layer of a semiconductor package, wherein the layer includes a metal layer, one or more first regions of the layer that do not satisfy a first layer design rule; adding first voids to the one or more first regions to satisfy the first layer design rule; determining for the layer including the metal pattern and the first voids, one or more second regions of the layer that do not satisfy a second layer design rule, different from the first layer design rule; and adding second voids to the one or more second regions to satisfy the second layer design rule.

20 Claims, 7 Drawing Sheets

SEMICONDUCTOR VOID PLACEMENT

TECHNICAL FIELD

Various aspects of this disclosure generally relate to methods, devices, and software for determining placement of voids (e.g. voids) in semiconductor packages.

BACKGROUND

The design and geometry of the metal planes in a semiconductor package affects the package's overall electrical performance, thermal performance, and yield. One aspect of package design (e.g. design of metal planes) is the placement of voids. Voids may compensate for various manufacturing challenges, such as by providing moisture escape paths (e.g., degassing voids) and improving distribution of copper density (e.g., inter and intra layer) to manage warpage and plating thickness. Void placement affects the electrical performance for both power delivery and signal integrity. In addition, the presence of voids in power metal planes leads to concentrated (high-density) current regions, which impair package's thermal performance.

Adding excess voids (e.g., more voids than needed) can achieve certain manufacturing performance, such as by avoiding blistering by providing moisture escape path (e.g. providing adequate degassing). However, the addition of excess voids can degrade the electrical and thermal performance by increasing the voltage drop across the package due to higher resistance, thereby creating localized high current density regions and loss in signal integrity due to increased changes in transmission line impedances. The quantity and placement of voids in the package also affects the copper density, which may be a factor in determining package warpage. Thus, an optimal count and position for the voids in the package design is a key to building a high-performing package.

Current strategies for determining void placement for degassing do not simultaneously consider the manufacturing design rule constraints, electrical constraints & guidelines, and the degassing effect of other voids and metal gaps in the design, when determining the placement of voids in metal planes. This leads to unoptimized designs with excessive numbers of voids. As stated above, having too many voids leads to increased electrical resistance, impaired signal integrity due to routing over voids, and reduced opportunity to tune the design for warpage and/or to shrink the package formfactor or thickness.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
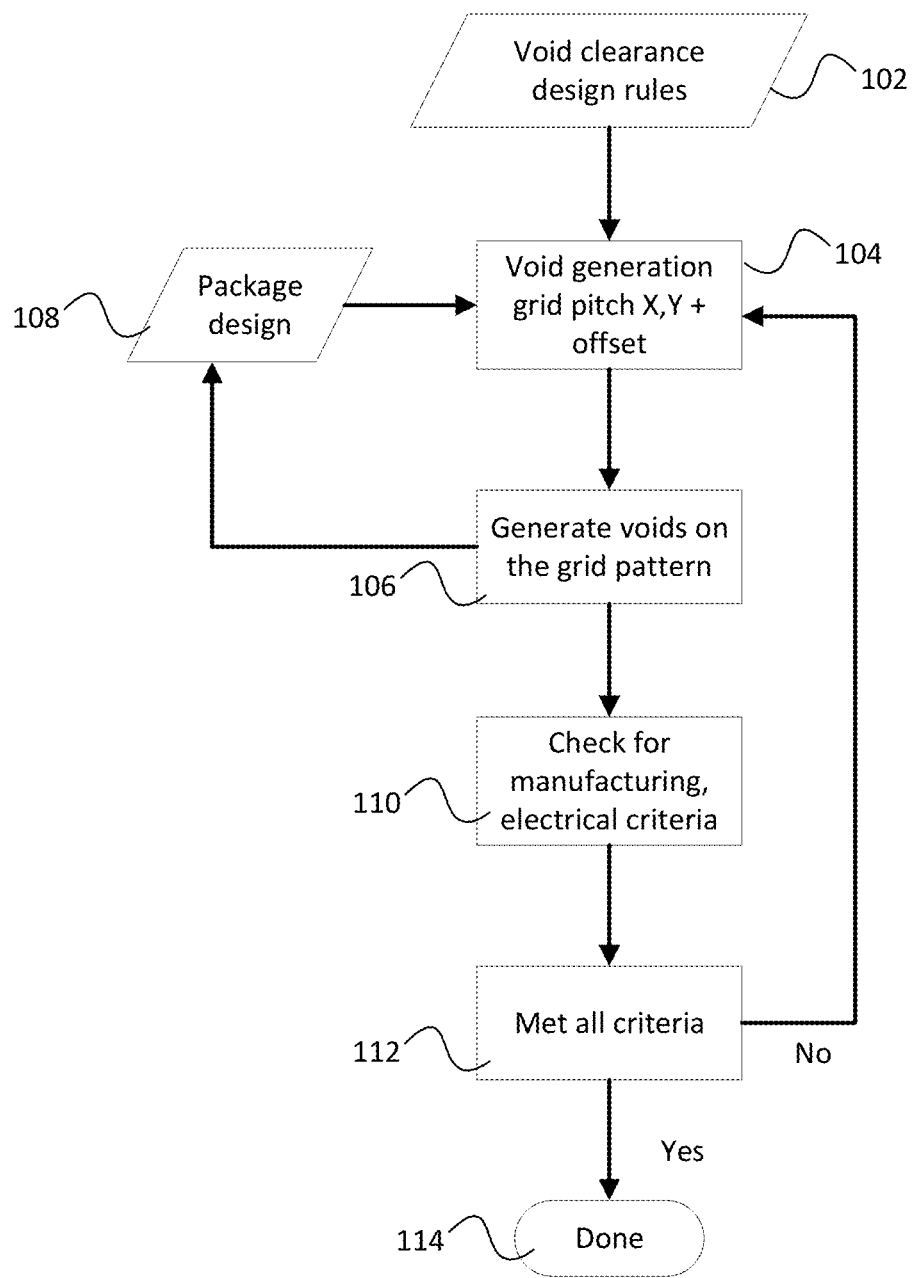
FIG. 1 depicts a flow diagram for conventional void determination for metal layers in semiconductor package design.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Various portions of the disclosure disclose the semiconductor package including one or more layers having a metal pattern. It is expressly noted that the metal pattern may be a trace pattern, which may include one or more electrically conductive paths from one portion of the layer to another portion of the layer. The paths may terminate in a through layer connection (e.g. a via), a contact pad, or otherwise. Alternatively or additionally, the metal pattern may be an essentially sheet-like pattern, in which some or all of the layer is covered with metal (e.g. wherein the "pattern" is simply a complete or partially complete covering of the layer).

FIG. 1 depicts a flow diagram for conventional void determination for metal layers in semiconductor package design. Given a metal layer design, and in light of the void clearance design rules 102, an arbitrary (e.g. estimated, such as based on the void clearance design rules) grid pitch or offset for the voids is selected 104. The voids are then generated in a model of the metal layer in accordance with the arbitrary grid pitch or offset 106. Using the arbitrary void placement, the resulting layers are assessed for package design factors, and the arbitrary grid pitch and offset may be adjusted iteratively until the package design factors are satisfied at step 108. Thereafter, the resulting package is assessed for manufacturing criteria (e.g. offgassing) or electrical criteria (e.g. impedance) 110. At step 112, if the resulting package has not satisfied the criteria of step 110, then the arbitrary grid pitch offset is reselected at step 104. If at step 112, the resulting package has satisfied the criteria of step 110, then the void placement is complete 114.

Because this procedure relies on generating voids using a regular grid defined by X, Y pitch+offset, it does not consider the real manufacturing design rules for degassing/copper balancing. Moreover, it does not consider the degassing behavior of already existing gaps in the metal (e.g. trace-to-trace gap, trace-to-metal plane gap, metal-plane-to-metal-plane gap, via-pad-to-metal-plane gap, etc.). This leads to a greater number of voids being added to the metal planes than necessary. Furthermore, these voids (e.g. these excess voids) are often placed at suboptimal locations. The greater-than-necessary number of voids negatively affects the power delivery due to increased electrical resistance and reduces signal integrity due to increased impedance changes along the transmission line path resulting from the routing over voids. The greater number of voids also reduces the ability to manage warpage by adjusting copper density distribution.

In addition, this procedure does not actively consider each of the manufacturing rules (e.g., void to solder, trench minimum spacing, spacing to embedded multi-die interconnect bridge (EMIB), voids area boundary conditions, etc.) and the electrical rules (e.g., routing over voids, spacing to adjacent layer traces, spacing to via pads to reduce current density, symmetry to differential pairs, etc.). This leads to largely suboptimal designs. Arriving at an acceptable (albeit often suboptimal) design requires multiple iterations of guessing pitch, placing, verifying, and editing the voids.

Finally, the above procedure can place only a single geometry (e.g., circle of particular radius, hexagon of defined size etc.) in a single iteration of the flow. Due to the static nature of the model of the package design features being used, current procedures cannot dynamically optimize the shape (circle, slot etc.) and the size of each void.

Figure 2:
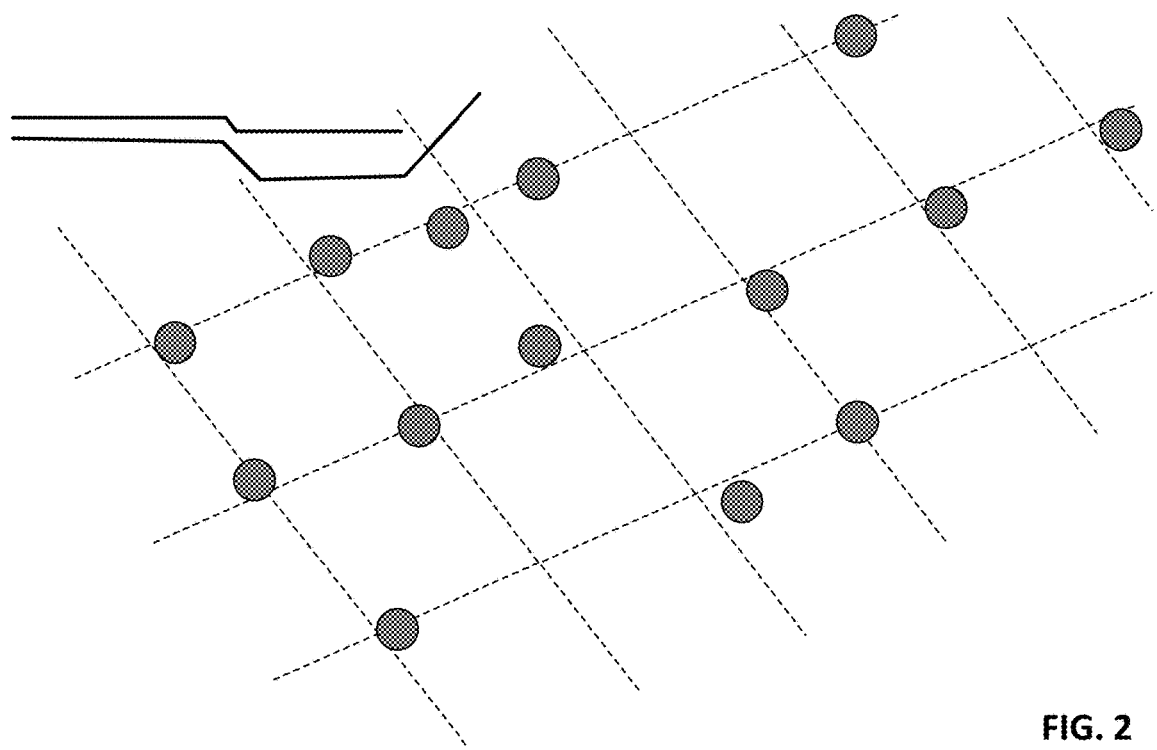
FIG. 2 depicts void quantity and placement according to the procedure of FIG. 1.
Figure 3:
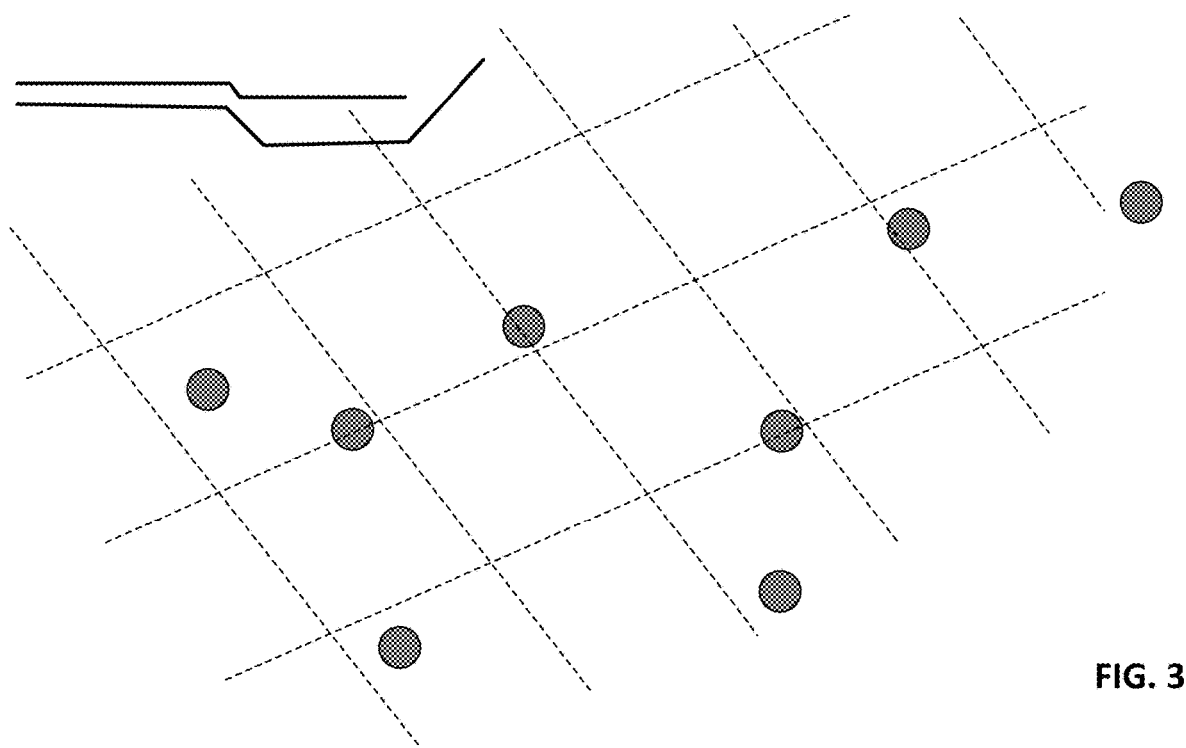
FIG. 3 depicts void placement as performed by the void placer as disclosed herein.

FIG. 2 depicts void quantity and placement according to a conventional procedure in which voids are placed with a fixed pitch plus an offset, such that voids largely align with points on a grid. In contrast, FIG. 3 depicts void placement as performed by the void placer as disclosed herein. As can be seen in FIG. 3 compared to FIG. 2, this results in fewer voids, and voids that may be more irregularly placed, as they are placed more closely with the areas in which they are needed rather than through necessity of adhering to a fixed pitch.

The principles, methods, and devices disclosed herein improve upon the conventional procedures at least by improving (e.g. refining, optimizing) any of position, count, shape, or size of voids by modelling the design features, degassing design rule, and copper balancing design rule while being constrained by other manufacturing rules and electrical rules. This procedure typically reduces the number of voids compared to the convention method. Finally, this procedure proactively accounts for individual routing over void limits per electrical net to optimize the void location for signal integrity.

The procedures described herein may create a model of a package design by accounting for the existing design features and applying manufacturing design rules, electrical rules, and/or guidelines to calculate a number (e.g. an improved or optimal number compared to the conventional method) and position of the voids to be added in the design. This procedure may dynamically model the impact of existing metal gaps and each new generated void on degassing and copper balancing to determine void deficit regions. According to an aspect of the disclosure, any or all of the metal and/or dielectric features on a layer may be modelled. This may include, but is not limited to, one or more metal traces, one or more planes, one or more vias, one or more pins, plated through holes (pth), one or more fiducial pads, etc.

According to an aspect of the disclosure, the procedure for determining void placement may classify the voids into either category one voids or category 2 voids. Category 1 voids may be understood as highly restrictive in their position and may be placed in some configurations to address the degassing criteria. Category 2 voids, in contrast, may be more flexibly positioned and may be placed in some configurations to meet the localized and global copper density distribution bounds. Similarly, the locations and count of category 1 voids may be determined to achieve minimum degassing paths while accounting for manufacturing clearances, metal width requirements, and electrical criteria, such as routing over void bounds, spacing from adjacent layer transmission lines, such as spacing for via pads to achieve optimal current density. The category 2 voids may be added to achieve uniform void density (new+existing) to meet the copper density distribution rules (copper balancing) while accounting for all the other manufacturing and electrical rules.

According to an aspect of the disclosure, the procedure of placing voids may include considering the design features, and accounting for the existing moisture escape paths (e.g., due to metal gaps between metal planes, traces, via pads and other already existing voids, etc.). New voids are only added in regions in which it is determined that there is a degassing deficit. In comparison to conventional pitch+offset methods, this dynamic modelling reduces the overall new void count, thereby improving signal integrity.

The position of each void may be optimized by considering the electrical and manufacturing criteria concurrently or simultaneously. As the entire model of the package design is considered, a more optimal choice of shape and size of the void is made such that it can fit in each region requiring a void while reducing the electrical impact and maximizing the degassing behavior.

Figure 4:
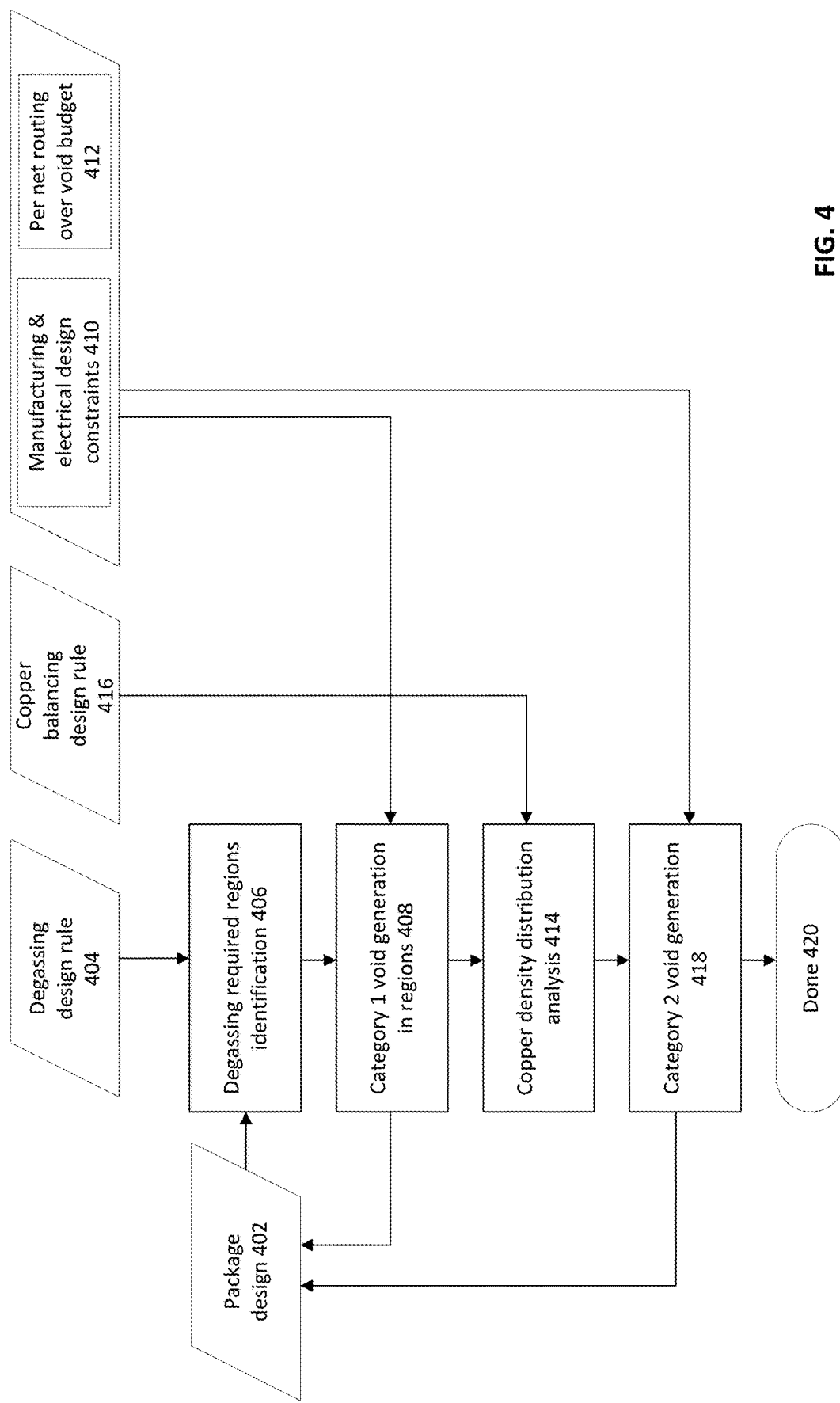
FIG. 4 depicts a procedure for void placement.

FIG. 4 depicts a procedure for void placement, according to an aspect of the disclosure. In this figure, a void placer receives a package design 402, including one or more metal layers. Using degassing design rules, 404, which may provide general requirements for void placement so as to provide sufficient voids for degassing, the void placer determines in the package design 402 one or more regions for which additional voids are necessary to meet degassing requirements 406 according to the degassing design rule (S) 404. Once the one or more regions for additional degassing voids are determined, the void placer generates voids (e.g., degassing voids, category one voids) in those regions 408 and generates an amended package design in which the additionally generated voids are present 402. According to an aspect of the disclosure, the void placer may generate voids, as in step 408, while accounting for manufacturing and electrical design constraints 410 and routing over the void budget 412. That is, the void placer will avoid placing voids, to the extent possible, where such placement renders aspects of the manufacturing impossible or impracticable and/or where such placement violates electrical design constraints (e.g. creates impedance above a threshold, creates unacceptable signal integrity, etc.). This process may be iteratively repeated until no more regions are identified in which additional voids are required for degassing according to step 406. Once it is determined that no additional voids are required for degassing, no additional voids will be placed at step 408, and the package design may be passed on to be evaluated for copper density distribution 414. In this step, the void placer evaluates copper density distribution 414 according to one or more copper balancing design rules 416. The copper balancing design rules 416 may be configured to balance the amount and placement of copper within the semiconductor package so as to prevent, minimize, or reduce warpage during the manufacturing process. During the copper density distribution analysis 414, the void placer may identify one or more regions in which additional voids are needed for copper balancing. The void placer may then place additional voids (e.g. category two voids, copper balancing voids) 418. The model of the package substrate with the additional voids from step 418 is stored as the new package design 402. This design is then reprocessed at step 406. Of note, in the reprocessing at 406, the void placer may determine one or more regions in which category one voids had been applied, in which excess category one voids are present. That is, although excess category one voids are generally not present during the transition between steps 408 and 414, the addition of category 2 voids at step number 418 may render one or more category one voids redundant or superfluous. These redundant or superfluous category one voids may be identified when step 406 is re-executed, and the void placer may remove (e.g. instead of generating) any excess, redundant, or superfluous category one voids at step 408. This may be performed iteratively until the semiconductor package has satisfied both the degassing design rules and copper balancing design rules without identification of excess, redundant, or superfluous category one voids, or otherwise until the process is complete 420.

Figure 5:
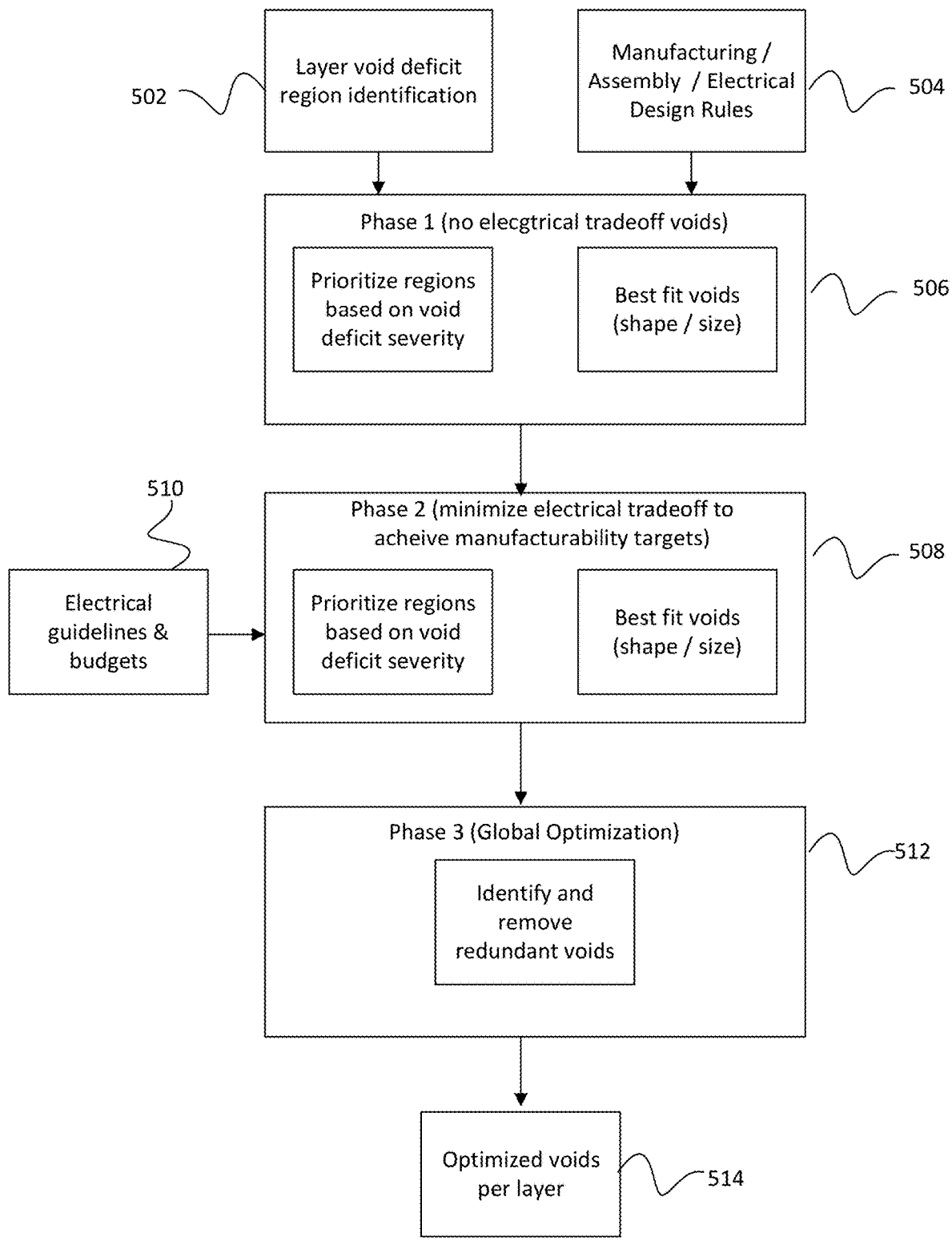
FIG. 5 depicts a three-phase void generation method.

FIG. 5 depicts a three-phase void generation method, according to an aspect of the disclosure. In this method, the void placer uses the layer void deficit region identification 502 and any of the manufacturing, assembly, or electrical design rules 504 to perform a phase 1 void generation in which the void placer prioritizes regions based on void deficit severity and applies voids to these regions 506. During the phase 1 void application, the void placer may select a shape and/or a size of the void to best fit the requirements of the manufacturing, assembly, electrical design rules 504 based on the prioritized regions. Phase 1 generates voids to meet the void deficit (e.g., degassing or copper balancing) while accounting for the relevant design rules. In this phase, voids are calculated to have zero electrical performance tradeoff (i.e. no new routing over voids is created, and maximum spacing is followed). Once sufficient voids have been placed to satisfy the manufacturing, assembly, electrical design rules 504, the semiconductor package design with the additional voids proceeds to phase two 508.

In phase two, the void placer utilizes electrical guidelines and budgets 510 to identify regions that lack sufficient voids to satisfy the electrical guidelines and budgets, and it places voids accordingly. Phase two makes active trade-offs of electrical budgets (e.g., routing over voids, increased void density) to achieve manufacturing and reliability targets. Phase one and Phase two optimize the void positions in each localized region on the layer. The void placer may select one or more shapes or sizes of void to achieve a best fit. At completion of phase two, the semiconductor package model with the additionally placed voids during phase two proceeds to phase 3 512.

During phase three, the voids from phase one are reassessed to identify any phase one voids that are redundant or superfluous. Phase three removes redundant voids (voids whose manufacturing impact is covered by other nearby phase two voids). Otherwise stated, these voids from phase one may be rendered redundant or superfluous by the addition of phase two voids. If any phase one voids are rendered redundant or superfluous as described herein, they may be removed during phase three. The resulting package is a package with optimized voids 514. In a first exemplary configuration, this procedure may be performed layer by layer. In a second exemplary configuration, the procedure may alternatively print be performed while taking multiple layers into account simultaneously.

Figure 6:
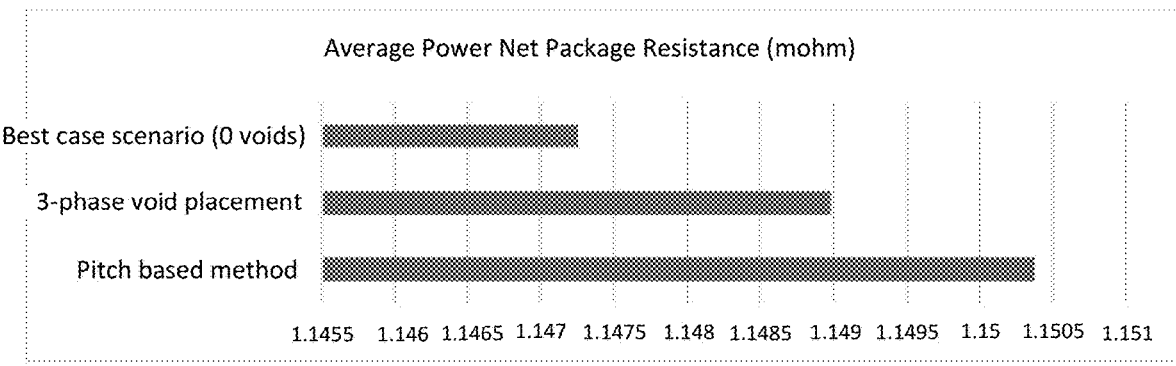
FIG. 6 depicts a comparison of package resistance compared to an ideal package.

FIG. 6 depicts a comparison of package resistance compared to an ideal package, a package with voids placed according to the three-phase procedure disclosed herein, and a package designed according to the conventional procedure. As depicted in this figure, the three-phase procedure disclosed herein results in improved net package resistance compared to the conventional (e.g. pitch-based) method.

As stated above, voids in the design may negatively affect the signal integrity. Voids on adjacent layers to transmission lines negatively affect the return path current and cause impedance changes along the path. These changes in impedance limit the data speed due to increased noise which leads to a narrower opening in the corresponding signal eye diagram. The procedures as disclosed herein reduce such impedance changes by proactively accounting for the routing over void limits per on adjacent layer routing.

Moreover, higher void density in a given region leads to higher current densities, and thus to higher temperatures. The procedures as disclosed herein reduce the void density (voids/mm$^2$) on an average by ~50% per layer as compared to a pitch-based void generation.

Figure 7:
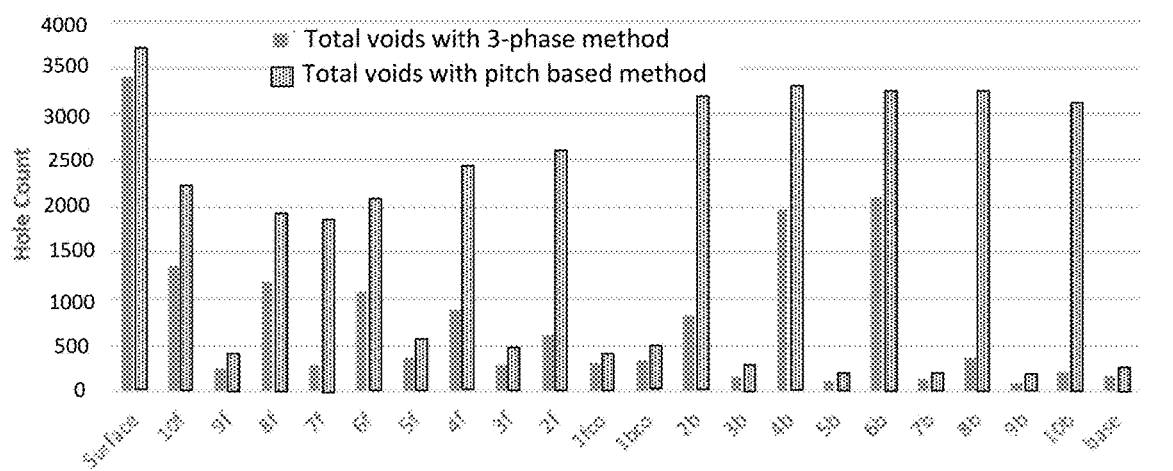
FIG. 7 depicts a comparison of the number of voids in a semiconductor package between a pitch-based model and the three-phase model.

FIG. 7 depicts a comparison of the number of voids in a semiconductor package between a pitch-based model and the three-phase model as described herein. As can be seen, significant reduction in voids can be achieved while satisfying the relevant design rules using the three-phase procedure.

Figure 8:
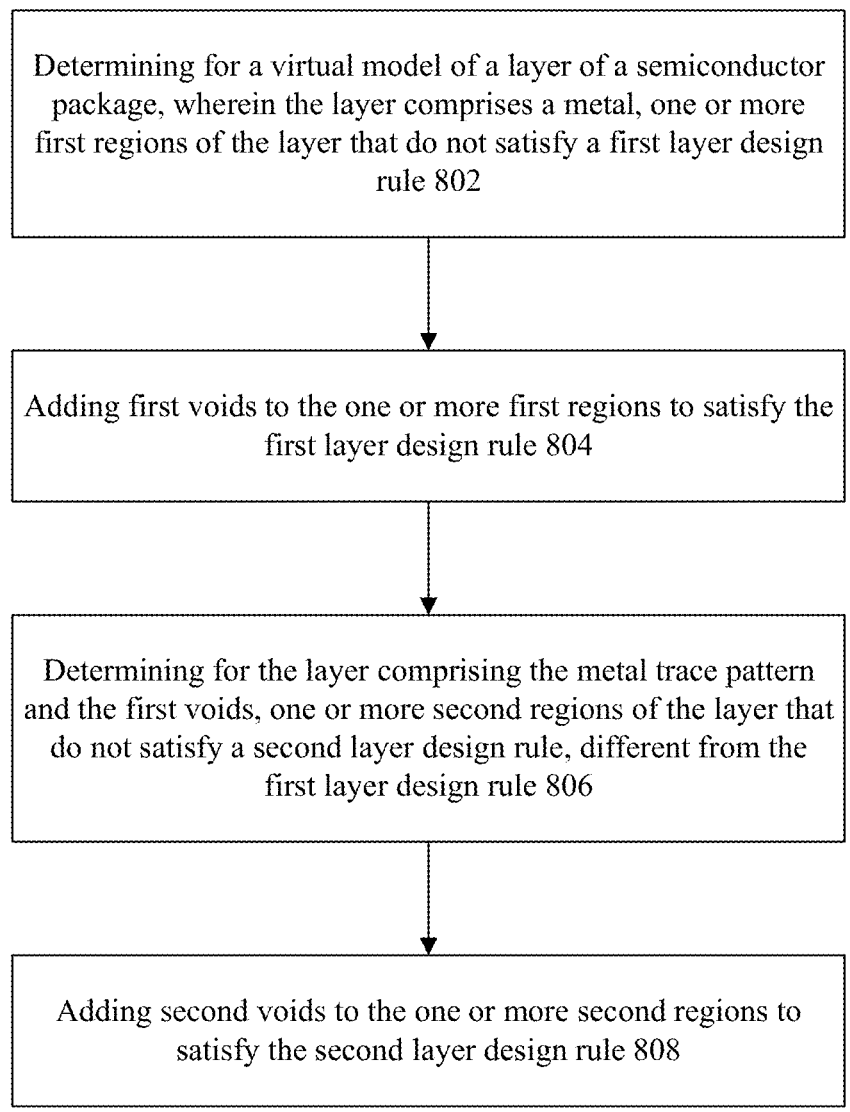
FIG. 8 depicts a method of semiconductor modelling.

FIG. 8 depicts a method of semiconductor modelling, including determining for a virtual model of a layer of a semiconductor package, wherein the layer includes a metal, one or more first regions of the layer that do not satisfy a first layer design rule 802; adding first voids to the one or more first regions to satisfy the first layer design rule 804; determining for the layer including the metal pattern and the first voids, one or more second regions of the layer that do not satisfy a second layer design rule, different from the first layer design rule 806; and adding second voids to the one or more second regions to satisfy the second layer design rule 808. In an optional configuration, and in addition to the above, the method may further include determining for the layer including the metal pattern, the first voids, and the second voids, a subset of the first voids that may be deleted without violating the first layer design rule; and deleting the subset of first voids from the layer.

In this method, the first design rule may be a degassing design rule and the second design rule may be a copper balancing design rule. In an alternative configuration, however, the first design rule may be a copper balancing design rule and the second design rule may be a degassing design rule. In an optional configuration, determining whether the layer satisfies the degassing design rule may include determining whether the layer satisfies any of void-to-solder-trench minimum spacing requirements, spacing-to-embedded-multi-die-interconnect-bridge requirements, or voids area boundary conditions. In a further optional configuration, determining whether the layer satisfies the copper balancing design rule may include determining any of whether the layer includes routing over voids, spacing to adjacent layer traces, spacing to via pads, or symmetry to differential pairs.

The methods and procedures disclosed herein may be implemented as a non-transitory computer readable medium, including instructions which, if executed, cause one or more processors to determine for a virtual model of a layer of a semiconductor package, wherein the layer includes a metal pattern, one or more first regions that do not satisfy a first layer design rule; add first voids to the one or more first regions to satisfy the first layer design rule; determine for the layer including the metal pattern and the first voids, one or more second regions of the layer that do not satisfy a second layer design rule, different from the first layer design rule; and add second voids to the one or more second regions to satisfy the second layer design rule.

Figure 9:
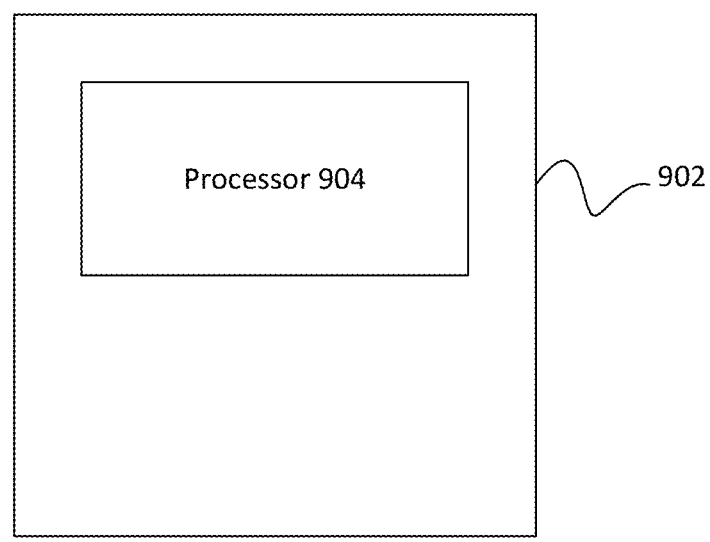
FIG. 9 depicts a void placer.

The methods and procedures disclosed herein may be implemented as a void placer. FIG. 9 depicts such a void placer 902 including a processor 904 configured to determine for a virtual model of a layer of a semiconductor package, wherein the layer includes a metal layer, one or more first regions of the layer that do not satisfy a first layer design rule; add first voids to the one or more first regions to satisfy the first layer design rule; determine for the layer including the metal pattern and the first voids, one or more second regions of the layer that do not satisfy a second layer design rule, different from the first layer design rule; and add second voids to the one or more second regions to satisfy the second layer design rule.

The principles and methods disclosed herein may be carried out by a void placer, including a first void placer, configured to determine for a virtual model of a layer of a semiconductor package, wherein the layer includes a metal pattern, one or more first regions that do not satisfy a first layer design rule, and to add first voids to the one or more first regions to satisfy the first layer design rule; a second void placer, configured to determine for the layer including the metal pattern and the first voids, one or more second regions of the layer that do not satisfy a second layer design rule, different from the first layer design rule; and add second voids to the one or more second regions to satisfy the second layer design rule. The void placer may include one or more processors, configured to perform the functions of the void placer.

Additional aspect of the disclosure will be described by way of Example:

In Example 1, a non-transitory computer readable medium, including instructions which, if executed, cause one or more processors to determine for a virtual model of a layer of a semiconductor package, wherein the layer includes a metal pattern, one or more first regions that do not satisfy a first layer design rule; add first voids to the one or more first regions to satisfy the first layer design rule; determine for the layer including the metal pattern and the first voids, one or more second regions of the layer that do not satisfy a second layer design rule, different from the first layer design rule; and add second voids to the one or more second regions to satisfy the second layer design rule.

In Example 2, the non-transitory computer readable medium of Example 1, wherein the instructions are further configured to cause the one or more processors to: determine for the layer including the metal pattern, the first voids, and the second voids, a subset of the first voids that may be deleted without violating the first layer design rule; and delete the subset of first voids from the layer.

In Example 3, the non-transitory computer readable medium of Example 1 or 2, wherein the first design rule is a degassing design rule and the second design rule is a copper balancing design rule.

In Example 4, the non-transitory computer readable medium of any one of Examples 1 to 3, wherein the first design rule is a copper balancing design rule and the second design rule is a degassing design rule.

In Example 5, the non-transitory computer readable medium of Example 3 or 4, wherein determining whether the layer satisfies the degassing design rule includes the instructions being configured to cause the one or more processors to determine whether the layer satisfies any of void-to-solder-trench minimum spacing requirements, spacing-to-embedded-multi-die-interconnect-bridge requirements, or voids area boundary conditions.

In Example 6, the non-transitory computer readable medium of any one of Examples 3 to 5, wherein determining whether the layer satisfies the copper balancing design rule includes the instructions being configured to cause the one or more processors to determine any of whether the layer includes routing over voids, spacing to adjacent layer traces, spacing to via pads, or symmetry to differential pairs.

In Example 7, the non-transitory computer readable medium of any one of Examples 1 to 6, wherein determining one or more first regions of the layer that do not satisfy the first design rule includes the instructions being configured to cause the one or more processors to simulate outgassing during manufacture of the layer and determining the one or more first regions as regions in which insufficient voids for outgassing are present.

In Example 8, the non-transitory computer readable medium of any one of Examples 1 to 7, wherein adding first voids to the one or more first regions to satisfy the first design rule includes the instructions being configured to cause the one or more processors to add a first subset of first voids having a first distance between adjacent first voids of the first subset and a second subset of first voids having a second distance between adjacent first voids of the second subset, wherein the first distance is different from the second distance.

In Example 9, the non-transitory computer readable medium of any one of Examples 1 to 8, wherein the instructions are further configured to cause the one or more processors to select a size of at least one of the first voids based on the first design rule.

In Example 10, the non-transitory computer readable medium of any one of Examples 1 to 9, wherein the instructions are further configured to cause the one or more processors to select a shape of at least one of the first voids based on the first design rule.

In Example 11, the non-transitory computer readable medium of any one of Examples 1 to 10, wherein the instructions are further configured to cause the one or more processors to select a size of at least one of the second voids based on the second design rule.

In Example 12, the non-transitory computer readable medium of any one of Examples 1 to 11, wherein the instructions are further configured to cause the one or more processors to select a shape of at least one of the second voids based on the second design rule.

In Example 13, a method of semiconductor modelling including determining for a virtual model of a layer of a semiconductor package, wherein the layer includes a metal layer, one or more first regions of the layer that do not satisfy a first layer design rule; adding first voids to the one or more first regions to satisfy the first layer design rule; determining for the layer including the metal pattern and the first voids, one or more second regions of the layer that do not satisfy a second layer design rule, different from the first layer design rule; and adding second voids to the one or more second regions to satisfy the second layer design rule.

In Example 14, the method of Example 13, further including: determining for the layer including the metal pattern, the first voids, and the second voids, a subset of the first voids that may be deleted without violating the first layer design rule; and deleting the subset of first voids from the layer.

In Example 15, the method of Example 13 or 14, wherein the first design rule is a degassing design rule and the second design rule is a copper balancing design rule.

In Example 16, the method of any one of Examples 13 to 15, wherein the first design rule is a copper balancing design rule and the second design rule is a degassing design rule.

In Example 17, the method of Example 15 or 16, wherein determining whether the layer satisfies the degassing design rule includes determining whether the layer satisfies any of void-to-solder-trench minimum spacing requirements, spacing-to-embedded-multi-die-interconnect-bridge requirements, or voids area boundary conditions.

In Example 18, the method of any one of Examples 15 to 17, wherein determining whether the layer satisfies the copper balancing design rule includes determining any of whether the layer includes routing over voids, spacing to adjacent layer traces, spacing to via pads, or symmetry to differential pairs.

In Example 19, the method of any one of Examples 13 to 18, wherein determining one or more first regions of the layer that do not satisfy the first design rule includes simulating outgassing during manufacture of the layer and determining the one or more first regions as regions in which insufficient voids for outgassing are present.

In Example 20, the method of any one of Examples 13 to 19, wherein adding first voids to the one or more first regions to satisfy the first design rule includes adding a first subset of first voids having a first distance from one another and a second subset of first voids having a second distance from one another, wherein the first distance is different from the second distance.

In Example 21, the method of any one of Examples 13 to 20, further including selecting a size of at least one of the first voids based on the first design rule.

In Example 22, the method of any one of Examples 13 to 21, further including selecting a shape of at least one of the first voids based on the first design rule.

In Example 23, the method of any one of Examples 13 to 22, further including selecting a size of at least one of the second voids based on the second design rule.

In Example 24, the method of any one of Examples 13 to 23, further including selecting a shape of at least one of the second voids based on the second design rule.

In Example 25, a void placer, comprising: a first void placer, configured to determine for a virtual model of a layer of a semiconductor package, wherein the layer includes a metal pattern, one or more first regions that do not satisfy a first layer design rule, and to add first voids to the one or more first regions to satisfy the first layer design rule; a second void placer, configured to determine for the layer including the metal pattern and the first voids, one or more second regions of the layer that do not satisfy a second layer design rule, different from the first layer design rule; and add second voids to the one or more second regions to satisfy the second layer design rule.

In Example 26, the void placer of Example 25, configured to perform any of the methods of Examples 13 to 25.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A non-transitory computer readable medium, comprising instructions which, if executed, cause one or more processors to:
   determine for a virtual model of a layer of a semiconductor package, wherein the layer comprises a metal pattern, one or more first regions that do not satisfy a first layer design rule;
   add first voids to the one or more first regions to satisfy the first layer design rule by dynamically modelling one or more requirements associated with the first layer design rule;
   determine for the layer comprising the metal pattern and the first voids, one or more second regions of the layer that do not satisfy a second layer design rule, different from the first layer design rule; and
   add second voids to the one or more second regions to satisfy the second layer design rule,
   wherein the first layer design rule is a degassing design rule and the second layer design rule is a copper balancing design rule.

2. The non-transitory computer readable medium of claim 1, wherein the instructions are further configured to cause the one or more processors to:
   determine for the layer comprising the metal pattern, the first voids, and the second voids, a subset of the first voids that may be deleted without violating the first layer design rule; and
   delete the subset of the first voids from the layer.

3. The non-transitory computer readable medium of claim 1, wherein determining the one or more first regions of the layer that do not satisfy the first layer design rule comprises the instructions being configured to cause the one or more processors to simulate outgassing during manufacture of the layer and determining the one or more first regions as regions in which insufficient voids for outgassing are present.

4. The non-transitory computer readable medium of claim 1, wherein adding the first voids to the one or more first regions to satisfy the first layer design rule comprises the instructions being configured to cause the one or more processors to add a first subset of the first voids having a first distance between adjacent first voids of the first subset and a second subset of the first voids having a second distance between the adjacent first voids of the second subset, wherein the first distance is different from the second distance.

5. The non-transitory computer readable medium of claim 1, wherein the instructions are further configured to cause the one or more processors to select a size of at least one of the first voids based on the first layer design rule.

6. The non-transitory computer readable medium of claim 1, wherein the instructions are further configured to cause the one or more processors to select a shape of at least one of the first voids based on the first layer design rule.

7. The non-transitory computer readable medium of claim 1, wherein the instructions are further configured to cause the one or more processors to select a size of at least one of the second voids based on the second layer design rule.

8. The non-transitory computer readable medium of claim 1, wherein the instructions are further configured to cause the one or more processors to select a shape of at least one of the second voids based on the second layer design rule.

9. A method of semiconductor modelling comprising:
   determining for a virtual model of a layer of a semiconductor package, wherein the layer comprises a metal pattern, one or more first regions of the layer that do not satisfy a first layer design rule;
   adding first voids to the one or more first regions to satisfy the first layer design rule, by dynamically modelling one or more requirements associated with the first layer design rule;
   determining for the layer comprising the metal pattern and the first voids, one or more second regions of the layer that do not satisfy a second layer design rule, different from the first layer design rule; and
   adding second voids to the one or more second regions to satisfy the second layer design rule,
   wherein the first layer design rule is a degassing design rule and the second layer design rule is a copper balancing design rule, and,
   wherein determining whether the layer satisfies the copper balancing design rule comprises determining any of whether the layer includes routing over voids, spacing to adjacent layer traces, spacing to via pads, or symmetry to differential pairs.

10. The method of claim 9, further comprising:
    determining for the layer comprising the metal pattern, the first voids, and the second voids, a subset of the first voids that may be deleted without violating the first layer design rule; and
    deleting the subset of the first voids from the layer.

11. The method of any one of claim 9, wherein determining the one or more first regions of the layer that do not satisfy the first layer design rule comprises simulating outgassing during manufacture of the layer and determining the one or more first regions as regions in which insufficient voids for outgassing are present.

12. The method of any one of claim 9, wherein adding the first voids to the one or more first regions to satisfy the first layer design rule comprises adding a first subset of the first voids having a first distance from one another and a second subset of the first voids having a second distance from one another, wherein the first distance is different from the second distance.

13. An apparatus comprising:
    a user interface;
    a memory; and
    processor configured to:
      determine for a virtual model of a layer of a semiconductor package, wherein the layer comprises a metal pattern, one or more first regions that do not satisfy a first layer design rule;
      add first voids to the one or more first regions to satisfy the first layer design rule by dynamically modelling one or more requirements associated with the first layer design rule;
      determine for the layer comprising the metal pattern and the first voids, one or more second regions of the layer that do not satisfy a second layer design rule, different from the first layer design rule; and
      add second voids to the one or more second regions to satisfy the second layer design rule,
      wherein the first layer design rule is a degassing design rule and the second layer design rule is a copper balancing design rule, and
      wherein determining whether the layer satisfies the degassing design rule further comprises the processor configured to determine whether the layer satisfies any of whether the layer includes routing over voids, spacing to adjacent layer traces, spacing to via pads, or symmetry to differential pairs.

14. The apparatus of claim 13, wherein the processor is further configured to:
determine for the layer comprising the metal pattern, the first voids, and the second voids, a subset of the first voids that may be deleted without violating the first layer design rule; and
delete the subset of the first voids from the layer.

15. The apparatus of claim 13, wherein determining the one or more first regions of the layer that do not satisfy the first layer design rule comprises the processor further configured to cause the one or more processors to simulate outgassing during manufacture of the layer and determining the one or more first regions as regions in which insufficient voids for outgassing are present.

16. The apparatus of claim 13, wherein adding the first voids to the one or more first regions to satisfy the first layer design rule comprises the processor further configured to configured to cause the one or more processors to add a first subset of the first voids having a first distance between adjacent first voids of the first subset and a second subset of the first voids having a second distance between the adjacent first voids of the second subset, wherein the first distance is different from the second distance.

17. The apparatus of claim 13, wherein the processor is further configured to cause the one or more processors to select a size of at least one of the first voids based on the first layer design rule.

18. The apparatus of claim 13, wherein the processor is further configured to cause the one or more processors to select a shape of at least one of the first voids based on the first layer design rule.

19. The apparatus of claim 13, wherein the processor is further configured to cause the one or more processors to select a size of at least one of the second voids based on the second layer design rule.

20. The apparatus of claim 13, wherein the processor is further configured to cause the one or more processors to select a shape of at least one of the second voids based on the second layer design rule.

* * * * *